March 7, 1967 J. F. HEISS ETAL 3,307,914
SALT DISSOLVER WITH SELF-CLEANING SOLUTION OUTLET-FILTER
Filed July 26, 1963 2 Sheets-Sheet 1
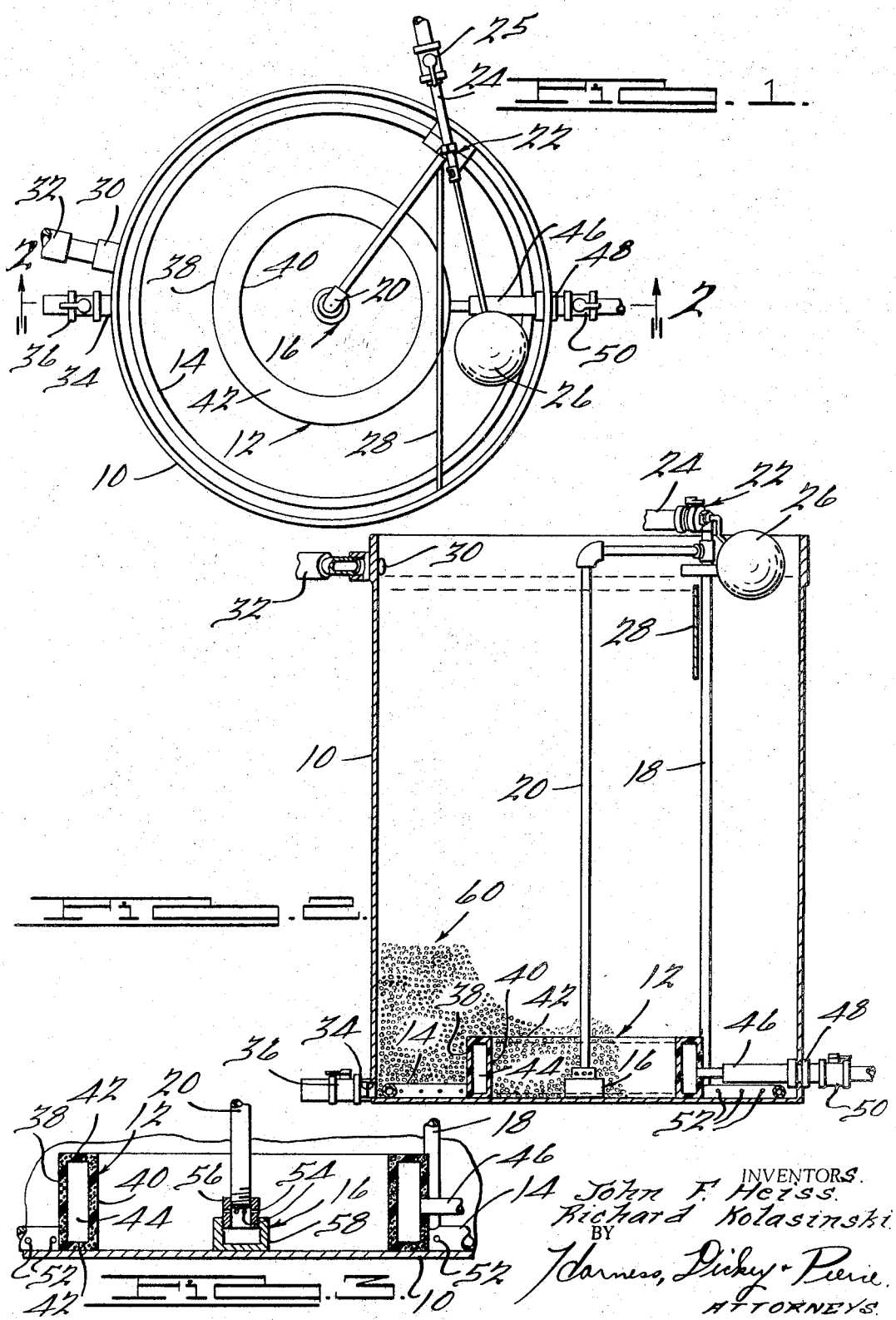
INVENTORS.
John F. Heiss.
Richard Kolasinski.
BY
Harness, Dickey & Pierce.
ATTORNEYS.

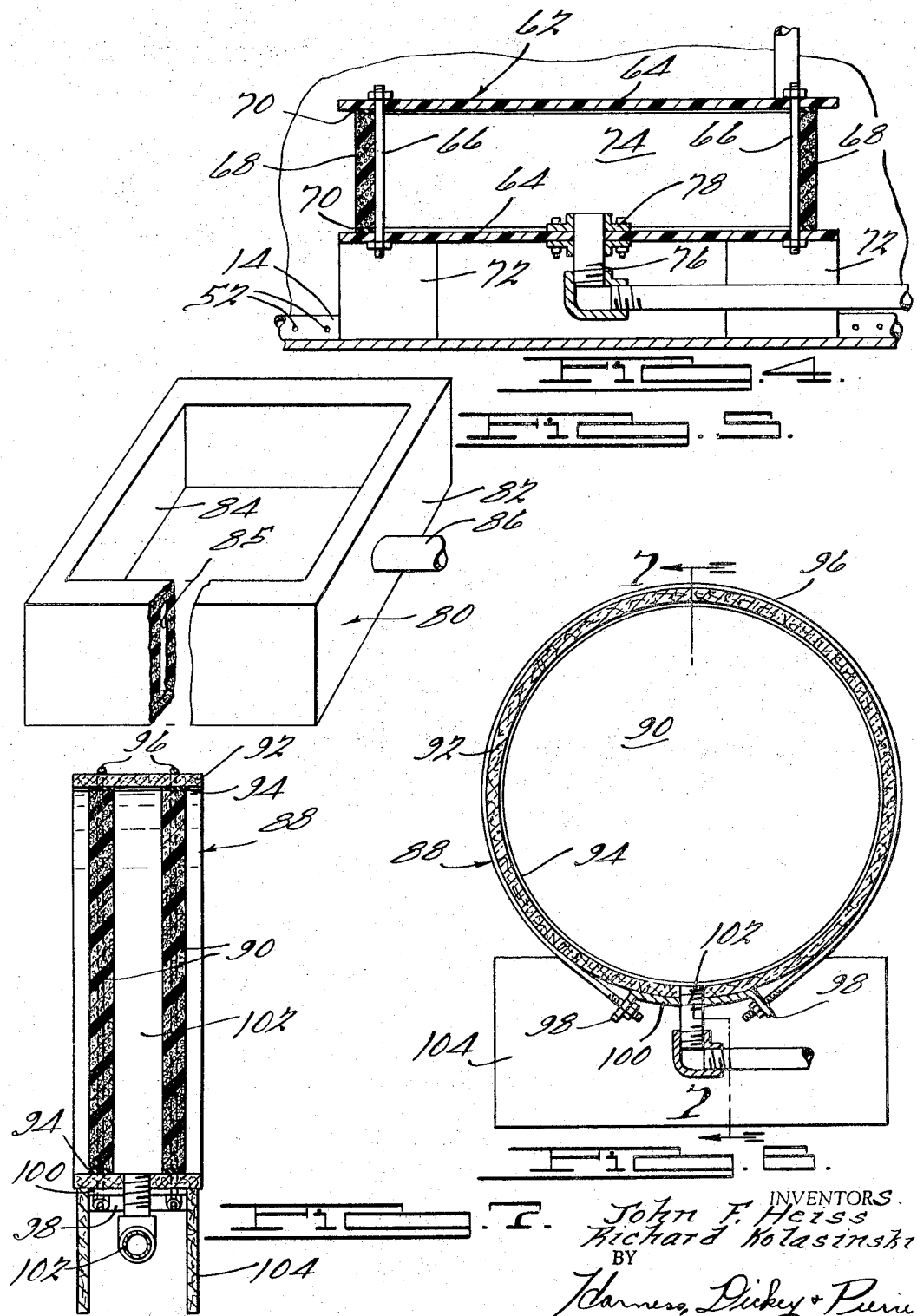

United States Patent Office 3,307,914
Patented Mar. 7, 1967

3,307,914
SALT DISSOLVER WITH SELF-CLEANING
SOLUTION OUTLET-FILTER
John F. Heiss, St. Clair, and Richard Kolasinski, Richmond, Mich., assignors to Diamond Crystal Salt Company, St. Clair, Mich., a corporation of Michigan
Filed July 26, 1963, Ser. No. 297,791
4 Claims. (Cl. 23—267)

The present invention broadly relates to apparatus for supplying concentrated salt solutions, and more particularly to an improved filter and water inlet arrangement for apparatus of this general type providing for increased liquid flow capacities and more rapid dissolution of the salt compound to be dissolved.

Apparatus of the aforementioned general type are in widespread commercial use for providing concentrated solutions of various liquid soluble compounds and particularly, aqueous solutions of water soluble salt compounds including ordinary sodium chloride salt, potassium chloride, potassium nitrate, sodium nitrate, calcium chloride, ammonium nitrate, ammonium sulfate and the like. The apparatus comprising the present invention is particularly applicable for, but not limited to, the generation and supply of saturated brine solutions using evaporated salt crystals for use in the food and meat packing industries, for example.

It has been conventional practice in salt dissolver units of the types heretofore known to employ a collector in the base of a receptacle which is placed beneath a gravel bed that serves as a filter for insoluble particles and undissolved salt particles. The particulated salt compound to be dissolved is placed over the gravel bed and liquid is added to the tank effecting progressive solution of the liquid soluble compound and the formation of a saturated solution which is withdrawn from the collector beneath the gravel bed either by gravity flow or by applying suction to the collector. Alternative filter media have heretofore been used or proposed for use in lieu of a gravel bed in an attempt to overcome the introduction of impurities into the saturated solution because of the gradual dissolution of some of the gravel in the concentrated solution formed. In addition, the use of a gravel bed makes it particularly difficult to inspect the collector unit and gravel bed to determine whether it is necessary to clean the bed and remove the impurities which have become entrapped within the interstices thereof.

A further drawback of apparatuses of the general type heretofore known is the limitation in the capacity of the unit to supply saturated salt solution due to the limitaions imposed by the porosity and compressibilty of the wet salt bed as effected by the rate of withdrawal of saturated salt solution. It is characteristic of these apparatuses that as the rate of withdrawal of saturated salt solution is increased, the bed of the particulated liquid soluble compound tends to become compacted because of the increased pressure drop across the bed. Under such conditions relatively drastic reductions in the generation and supply of saturated salt solutions has occurred due to the plugging effect of partially dissolved salt particles which become compressed into the voids between the larger salt particles effecting a closing of the flow channels through the bed of liquid soluble particulated compound. Accordingly, it has heretofore been found necessary to construct units of a substantially larger size than the conventional capacity to provide for peak flow rates which are required from time to time without incurring severe restrictions in flow rates due to the compressibilty effect. This practice of employing oversized units is obviously costly and space consuming.

It is accordingly a principal object of the present invention to provide an improved salt dissolving unit incorporating a filter and collector arrangement and liquid inlet location relative to the filter which overcomes the problems and disadvantages associated with equipment of similar type heretofore known.

Another object of the present invention is to provide an improved salt dissolver unit employing a filter of controlled porosity the major surfaces of which are oriented in an upright position in a manner such that the undissolved salt moving downwardly toward the region of maximum dissolution produces a wiping action across the face of the filter tending to dislodge any particles which have accumulated thereon providing therewith a self-cleaning action.

Still another object of the present invention is to provide an improved salt dissolver unit employing inlet means for discharging liquid into the receptacle at a point spaced below the filter surfaces effecting thereby a partial fluidization of the undissolved liquid soluble particulated salt charge and avoiding plugging or compressibility of the salt bed during periods of relatively high rates of withdrawal of the saturated solution.

A further object of the present invention is to provide an improved salt dissolver-filter unit incorporating therein an improved filter device which provides the dual function of filtering the saturated solution generated removing any extraneous insoluble particles and undissolved soluble particles therefrom and collects the saturated solution for simple withdrawal to a device or supply tank connected thereto.

A still further object of the present invention is to provide an improved salt dissolver-filter unit which is of simple design, operation and service; is of versatile use, is of compact size, is of greater capacity than units of similar size heretofore known, and is of economical manufacture and use.

The foregoing and other objects and advantages of the present invention are achieved by a salt dissolver-filter unit characterized as including a receptacle adapted to be at least partially filled with a particulated liquid soluble compound having a filter unit positioned therein including a porous surface the predominant area of which is disposed in an upright plane and defining an internal chamber for receiving the saturated salt solution passing therethrough which is drained therefrom to a point exteriorly of the receptacle by means of a conduit disposed in communication with the interior of the chamber. The fresh liquid is supplied to the receptacle through a distributor incorporating at least one outlet nozzle therein positioned at a point spaced below the level of said filter effecting a partial fluidization of the bed of particulated liquid soluble compound and a wiping action to the upright surfaces of the filter medium. It is also contemplated within the scope of the present invention that the saturated solution can be withdrawn from the chamber within the filter unit either by gravity or by suction supplied through suitable pumping means.

Other objects, features, and advantages of the present invention will become apparent from the subsequent description and the appended claims, taken in conjunction with the accompanying drawings, in which:

FIGURE 1 is a plan view of a salt dissolver-filter unit constructed in accordance with the preferred embodiments of the present invention;

FIG. 2 is a vertical sectional view of the salt dissolver-filter unit shown in FIGURE 1 and taken substantially along the line 2—2 thereof;

FIG. 3 is an enlarged vertical sectional view of the filter unit and liquid distributor conduits of the salt dissolver-filter unit shown in FIGS. 1 and 2.

FIG. 4 is a fragmentary vertical sectional view of an alternative satisfactory filter unit and further illustrating means for adjustably positioning the filter unit in vertically spaced relationship relative to the bottom of the tank;

FIG. 5 is a perspective view partly in section of another alternative satisfactory construction of a filter unit from that shown in FIGS. 1–4;

FIG. 6 is a vertical sectional view of still another alternative satisfactory construction and configuration of a filter unit from that shown in the prior figures; and FIG. 7 is a transverse vertical sectional view of the filter shown in FIG. 6 and taken along the line 7—7 thereof.

Referring now in detail to the drawings and as may be best seen in FIGURES 1–3, the salt dissolver-filter unit constructed in accordance with the preferred embodiments of the present invention comprises a receptacle or tank 10 incorporating an annular filter unit 12 disposed contiguous to the base thereof and positioned substantially concentrically relative to a distributor ring 14 encircling the periphery of the filter unit and an inlet head 16 disposed centrally of the interior thereof. Fresh liquid is supplied to the distributor ring 14 and the inlet head 16 by means of conduits or pipes 18, 20, respectively, which are connected to the outlet side of a float control valve 22 disposed adjacent to the upper edge of the tank 10. Fresh liquid is supplied to the inlet side of the float control valve 22 by means of a supply pipe 24 including a shut-off valve 25 connected to a supply tank (not shown) or central supply system as the case may be. The float control valve 22 is provided with a float 26 shielded by a transverse baffle 28 extending across one side of the tank for maintaining the liquid level within the tank at the desired level. Inadvertent overflowing of the tank with liquid as may be encountered during the loading of solid particulated liquid soluble salt therein is achieved by means of an overflow port 30 provided along the upper edge of the tank 10 which is in turn connected to a suitable overflow line 32 for discharging the excess liquid into a suitable overflow tank or a drain as desired. The entire tank can be drained of liquid as may be required from time to time through a drain port 34 in the base of the tank 10 which is provided with a drain valve 36. The various components comprising the salt dissolver-filter apparatus as hereinabove described, are of a material which is chemically resistant to the liquid, soluble compound, and saturated salt solution contained therein.

While the apparatus comprising the present invention is applicable for forming saturated solutions employing any one of a variety of liquid solvents and liquid soluble particulated compounds, its use is particularly suitable for forming saturated aqueous solutions of either one of a variety of particulated solid water soluble salts and specifically saturated brine solutions from evaporated sodium chloride salt. Since the apparatus is eminently satisfactory for providing a continuous supply of saturated brine of high quality, further description of its construction and operation as hereinafter provided will be made in connection with its use as a brine unit. It will be understood, however, that the principles of construction and operation are equally applicable to the generation and supply of any one of a variety of other suitable saturated solutions of liquid soluble compounds in a variety of solvents or mixtures thereof.

In order to resist chemical attack by saturated brine solutions, the various components of the dissolver-filter unit can be satisfactorily fabricated from chemically resistant materials including stainless steel, monel, and reinforced synthetic plastics such as fiber glass reinforced vinyl polymers. Alternatively, the unit can be constructed of conventional materials having an adherent chemically resistant coating thereover such as a vinyl plastisol coating to protect the surfaces from chemical attack.

The filter unit 12 as incorporated in the salt dissolver-filter unit shown in FIGURES 1–3 is of an annular ring-shaped configuration including an outer cylindrical filter face 38 and an inner cylindrical filter face 40 which are connected along their upper and lower edges by porous webs 42 defining therewith an annular chamber 44. The outer cylindrical filter face 38 is positioned substantially concentric to the distributor ring 14 therearound and the inner cylindrical filter face 40 is positioned concentric to the inlet head 16 disposed at substantially the center of the tank 10 and adjacent to the base thereof. The inner and outer cylindrical filter faces are comprised of a porous material such as a porous synthetic plastic or ceramic material having a porosity of a size to prevent passage of insoluble particles and partially dissolved soluble particles therethrough and is of a sufficient depth to provide a tortuous path to entrap any minute particles which may enter the interstices of the filter material. The upper and lower porous webs 42 of the filter unit 12 may similarly comprise a porous material of the type corresponding to the outer and inner cylindrical filter faces as shown in FIGURES 1–3, or, alternatively, may comprise imperforate rings of a suitable chemically resistant material such as a fiber glass reinforced synthetic plastic, for example.

While fused porous ceramic filter materials such as fused Alundum, for example, have provided satisfactory operation, porous filter materials comprising expanded synthetic plastic materials are preferred due to their lower cost and ease of fabrication. Synthetic plastic filter materials which have been tested and have been found to provide satisfactory filtration for a variety of finely particulated sodium chloride crystals during the production of saturated brine solutions include olefinic polymers such as linear polyethylene and copolymers such as the copolymerization product of styrene and acrylonitrile.

Regardless of the particular material of which the filter medium is comprised, it has been found that by employing a filter medium having an average pore size approximately equal to that of the smallest solid salt particles added to the tank will effectively prevent the passage of any undissolved or partially dissolved salt crystals of even smaller sizes from the brine produced. For example, filter media tested having average pore sizes of 395, 412 and 720 microns, have been found to effectively retain particles of a size of 150, 172, and 300 microns, respectively. These data confirm that the pore size of the filter medium may be more than twice the diameter of the particles without allowing the particles or partially dissloved smaller particles thereof to pass through the filter.

The foregoing is believed due to the relatively low velocity of liquid passing through a unit area of the filter face whereby the relatively larger salt particles will not become entrained in the liquid flowing toward the filter face but instead settle by gravity toward the bottom of the tank. In those cases where a higher flow velocity occurs adjacent to a localized point of the filter face, it is conceivable that some of the small partially dissolved crystals may become entrained in the liquid and enter the filter medium. However, in view of the fact that the path through the relatively thick filter medium is tortuous, the probability that the particle will pass through the filter without dissolving is very remote because crystals of such a minute size have a relatively high surface to volume ratio greatly increasing their rate of solution. Accordingly, such small particles conventionally become completely dissolved before they are able to pass completely through the filter medium.

It may also be desirable, depending upon the particular physical strength properties of the filter medium used, to incorporate suitable reinforcing materials such as an open mesh screen along the inner surfaces of the annular chamber 44 providing increased structural strength of the filter unit to resist the gravitational compressive forces imposed thereon by the undissolved particulated salt particles contained in the tank. Alternatively, the upper and lower webs 42 of the annular ring as hereinbefore mentioned, may comprise an imperforate high strength material having transverse supports extending therebetween to resist downward compressive forces of the salt charge within the tank.

In the exemplary arrangement shown in FIGURES 1–3, the annular chamber 44 of the filter unit 12 is connected by means of a conduit 46 of a suitable plastic material such as nylon or polyvinyl chloride, for example, which in turn is connected to a coupling 48 extending through the wall of the tank 10 having a discharge valve 50 connected thereto. Accordingly, the saturated brine solution filtering through the filter material into the chamber is continuously withdrawn therefrom either by gravity flow or by applying suction thereto for supplying associated equipment or is discharged into a brine storage tank.

Fresh liquid solvent or fresh water in the case of the generation of saturated brine is continuously supplied into the base of the tank 10 by means of the distributor ring 14 and the inlet head 16. As best seen in FIGURE 3, the distributor ring 14 comprises a pipe having a plurality of orifices or nozzles 52 disposed in substantially equal increments therealong effecting a substantially uniform flow of liquid upwardly along the outer cylindrical filter face 38 of the filter unit 12. The size of the orifices 52 and the number thereof provided is controlled by the size of the salt dissolver-filter unit and the capacity of brine withdrawal from the annular chamber 44 of the filter unit.

Fresh water is concurrently discharged from a plurality of radially extending nozzles 54 in the inlet head 16. The inlet head as shown in FIGURE 3 comprises a coupling 56 threadably engaged to the end of the pipe 20 to the lower end of which a pipe cap 58 is threadably secured. The number and size of the nozzles 54 positioned radially in the coupling 56 of the inlet head is controlled in consideration of the liquid flow capacity of the distributor ring 14 so as to provide a proportionate discharge of liquid to supply fresh makeup water in direct proportion to the relative areas of the outer cylindrical filter face 38 and inner cylindrical filter face 40. In this way substantially uniform flow velocities of the saturated brine through each unit area of the filter material is substantially uniform across its entire surface. The quantity of liquid discharged through the distributor ring and inlet head at any given time is controlled by the float control valve 22 to supply fresh makeup water in direct proportion to the saturated brine withdrawn from the tank maintaining the level of liquid therein substantially constant.

The fresh water discharged from the orifices 52 in the distributor ring and the nozzles 54 in the inlet head impinges on and moves upwardly through the particulated bed of water soluble salt particles indicated at 60 in FIGURE 2, which are maintained at an operating depth sufficient to cover the upper web of the filter unit at all times. In the arrangement as shown in FIGURES 2 and 3, the fresh water is introduced into the tank at a position below or adjacent to the lower edge of the cylindrical filter faces 38 and 40 necessitating an upward flow thereof through the particulated salt crystals effecting a partial fluidization thereof and avoiding compressibility of the wet salt bed during periods of high brine withdrawal. The region of maximum dissolution of the salt crystals occurs at a point adjacent to the base of the tank contiguous to the discharge orifices 52 in the distributor ring and nozzles 54 in the inlet head such that downward gravitational movement of the remaining salt particles in the tank to replace the particles dissolved provides a wiping action across the inner and outer cylindrical filter faces imposing a self-cleaning action on the filter unit.

It is important in order to achieve the benefits of the present invention that the filter faces or a predominant portion thereof be disposed in a substantially upright position and that the point of fresh water or solvent inlet be located at a point below or adjacent to the base of the filter faces. This relationship is important in order to provide the constant wiping and cleaning action of the filter faces as well as providing partial fluidization of the granulated salt bed preventing compression and/or packing thereof which otherwise would restrict liquid flow and drastically reduce the output capacity of the unit during periods of high withdrawal of saturated brine from the annular chamber of the filter unit. In accordance with the salt dissolver-filter unit constructed in accordance with the embodiments as illustrated in FIGURES 1–3, compressibility of the bed of soluble material is avoided providing uniform dissolution of the material. Moreover, the construction shown provides for a comparatively large area of filter surface per unit volume of the filter unit providing for a compact construction.

It will be apparent from the parameters as hereinbefore set forth that the total area of filter face required for a given installation is established by considerations between the pore size of the filter material, the face velocity, the thickness of the filter medium, and the hydrostatic head differential. It has further been found that when plastic materials are employed as the porous filter medium, greater aqueous brine flow rates are obtained if the material is hydrophilic rather than hydrophobic. Optimization of the filter unit is achieved by providing a filter unit having the greatest area practical, a maximum pore size in consideration of the thickness of the filter to entrap any small entrained partially dissolved salt crystals or insoluble particles, and a minimum flow rate per unit area to achieve the requisite brine making capacity.

A salt dissolver-filter unit corresponding to the construction as shown in FIGURES 1–3 employing a filter unit which was five inches high, had an outside diameter of 20 inches, an inside diameter of 16½ inches, and was fabricated from a ½ inch thick filter material consisting of a porous copolymer of styrene and acrylonitrile having an average pore size of about 250 microns and positioned in a tank having a diameter of 3 feet and a height of 4 feet, was effective to dissolve one ton of granulated salt crystals of a cubicle shape in a period of slightly more than 1 hour at a flow rate in excess of 500 gallons per hour of brine which was saturated in excess of 96%.

An alternative satisfactory construction of a filter unit providing the benefits of the present invention is illustrated in FIGURE 4. The filter unit designated at 62 in FIGURE 4 comprises a pair of circular planar heads 64 which are fastened together in aligned and spaced substantially parallel relationship by means of a plurality of circumferentially spaced bolts 66. A porous filter material 68 extends around the outer edges of the heads 64 outwardly of the bolts 66 and is provided with a sealing gasket indicated at 70 along its upper and lower edges forming a liquid-tight seal with the heads 64 in contact therewith.

The entire filter unit 62 is spaced from the base of the tank 10 by means of a series of supports 72 which effects an increase in the distance of upward flow of the fresh water discharged from the outlet orifices 52 in the distributor ring 14. In this regard it will be appreciated that by varying the relative height of the surfaces or filter faces relative to the fresh water inlet ports, the appropriate degree of saturation of the solution can be obtained consistent with the nature of the soluble material and solvent in combination with the flow rates of liquid through the granulated bed.

The filter unit 62 incorporates an internal cylindrical chamber 74 which is disposed in communication with a discharge line 76 coupled to a flanged union 78 mounted in substantially the center of the lower filter head 64. The operation of the filter unit 62 as shown in FIGURE 4 is similar to that hereinbefore described in connection with the filter unit 12 with the exception that no internal filter face is provided and the entire supply of fresh solvent is provided by the distributor ring 14 encircling the outer portion of the filter unit.

The filter units shown in FIGURES 1–4 are not necessarily restricted to a circular configuration but may be of a square, rectangular, or polygonal configuration as typified by the filter unit 80 shown in FIGURE 5. The filter unit 80 is of the general type shown in FIGURES 1–3 incorporating an outer rectangular filter face 82 and an inner rectangular filter face 84 which are adapted to be disposed in a substantially upright position and which define in combination with the upper and lower webs thereof an inner chamber 85 for accumulating the saturated brine solution which is withdrawn therefrom through a discharge outlet 86 in the side thereof. Filter units 62 of the construction shown in FIGURE 4 may similarly be fabricated in a rectangular or other polygonal shaped configuration consistent with the particular configuration of the tank in which they are to be disposed. In cases where the substantially upright faces of polygonal shaped filter units are employed in irregular or regular shaped tanks, it is desirable to employ fresh water or solvent inlet means which provide a substantially uniform distribution of liquid along the filter faces assuring a substantially uniform flow velocity per unit area of filter surface.

Still another alternate satisfactory construction of a filter unit is illustrated in FIGURES 6 and 7. As shown in these drawings, a filter unit indicated at 88 comprises a pair of filter discs 90 of a planar circular shape which are disposed in spaced substantially parallel upright positions and are retained in that position by means of an encircling strap or band 92. A suitable seal 94 of a resilient chemically resistant material such as polyurethane plastic, for example, is positioned between the edges of the filter discs 90 and the encircling strap 92 effecting a substantially liquid-tight seal therebetween. The strap 92 is clamped in overlying relationship around the edges of the filter discs 90 by means, such as a pair of compression rings 96 anchored to outwardly turned ears 98 of a support plate 100. The upright cylindrical chamber 102 formed within the filter unit 88 is disposed in communication with a discharge line 102 affixed to the bottom thereof for withdrawing the saturated brine or other solution from the interior of the filter unit. The entire filter unit assembly is supported on a suitable frame indicated at 104 which is adapted to be placed on the base of a tank.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A salt dissolver-filter unit comprising a tank adapted to be at least partially filled with a particulated liquid soluble compound, a filter unit positioned in substantially the bottom portion of said tank comprising a pair of spaced-apart porous side walls connected together along the upper edges thereof by an upper porous wall and along the lower edges thereof by a bottom wall defining therebetween an internal chamber for receiving the saturated solution passing therethrough, the predominant area of the exterior face of each of said side walls disposed in an upright position, conduit means disposed in communication with said chamber for withdrawing the saturated solution therefrom to a point exteriorly of said tank, and liquid supply means including a first distributor conduit incorporating a plurality of outlet nozzles therein for discharging fresh liquid into said tank at a point spaced below the level of one of said porous side walls, and a second distributor conduit having outlet means for discharging fresh liquid into said tank at a point spaced below the level of the other of said porous side walls.

2. A salt dissolver-filter unit comprising a tank adapted to be at least partially filled with a particulated water soluble salt, a filter unit positioned in the bottom portion said tank comprising a pair of spaced-apart substantially annular endless porous side walls connected together along the upper edges thereof by an upper endless porous wall and along the lower edges thereof by a bottom wall defining therebetween an internal chamber for receiving the saturated salt solution passing through the filter, the predominant area of the exterior face of each of said side walls disposed in an upright position, conduit means disposed in communication with the interior of said chamber for withdrawing the saturated solution therefrom to a point exteriorly of said tank and for applying a differential hydrostatic head across said filter face, and fresh water supply means including a first distributor conduit incorporating a plurality of outlet nozzles therein disposed around the periphery of the outer of said side walls and a second distributor conduit having outlet means disposed within the area defined by the inner of said side walls, said nozzles and outlet means being arranged to discharge fresh water into said tank at a level spaced beneath the porous surfaces of said side walls effecting a substantially uniform flow of liquid upwardly toward said porous surfaces.

3. A salt dissolver-filter unit comprising a tank adapted to be at least partially filled with a particulated liquid soluble salt, a filter unit positioned in said tank and embedded in the particulated salt, said filter unit comprising an annular ring including a porous cylindrical outer surface and a porous cylindrical inner surface disposed substantially concentric to said outer surface and disposed in a substantially upright position and defining a collecting chamber therebetween, conduit means disposed in communication with said collecting chamber for withdrawing the saturated solution therefrom to a point exteriorly of said tank, and liquid supply means including a first distributor conduit encircling said outer porous surface and formed with a plurality of orifices therein for discharging fresh liquid into said tank at a level spaced below said outer porous surface and a second distributor conduit incorporating a plurality of nozzles therein disposed centrally of said inner surface for discharging fresh liquid at a level spaced below said inner porous surface effecting substantially uniform flow of fresh liquid upwardly through the particulated liquid soluble salt toward said outer and inner porous surfaces.

4. A salt dissolver-filter unit comprising a tank adapted to be at least partially filled with a particulated liquid soluble compound, a filter unit positioned in said tank and disposed below the level of the salt compound therein, said filter unit including an outer cylindrical porous surface and an inner cylindrical porous surface disposed in a substantially upright position and disposed substantially concentric to each other defining therebetween an annular collecting chamber, conduit means disposed in communication with said collecting chamber for withdrawing saturated solution therefrom to a point exteriorly of said tank, and liquid supply means including a first distributor conduit encircling the periphery of said outer porous surface and formed with a plurality of orifices spaced at substantially equal circumferential increments therealong for discharging fresh liquid into said tank at a level spaced below said outer porous surface and a second distributor conduit formed with an inlet head having a plurality of radially disposed nozzles therein positioned centrally of said inner porous surface for discharging fresh liquid into said tank at a level disposed below said inner porous surface effecting a substantially uniform upward flow of liquid through the particulated soluble compound toward said outer and said inner porous surfaces, and means for controlling the supply of fresh liquid into said tank in accordance with the rate of withdrawal of saturated solution from said collector chamber.

References Cited by the Examiner
UNITED STATES PATENTS

| | | | |
|---|---|---|---|
| 466,152 | 12/1891 | Blackmore | 23—272.6 |
| 550,583 | 12/1895 | Brinckman | 210—409 |
| 588,418 | 8/1897 | Gaynor | 23—272.6 |
| 951,742 | 3/1910 | Rothwell | 23—271 X |
| 2,258,063 | 10/1941 | Meyer | 210—409 |
| 2,371,720 | 3/1945 | Stine | 23—271 |
| 2,387,945 | 10/1945 | McSow | 23—271 X |
| 3,123,445 | 3/1964 | Heath | 23—272 X |
| 3,145,087 | 8/1964 | Walker | 23—311 X |

FOREIGN PATENTS 637,912  3/1962  Canada.

NORMAN YUDKOFF, *Primary Examiner.*

S. J. EMERY, *Assistant Examiner.*

UNITED STATES PATENT OFFICE
CERTIFICATE OF CORRECTION

Patent No. 3,307,914                                  March 7, 1967

John F. Heiss et al.

It is hereby certified that error appears in the above numbered patent requiring correction and that the said Letters Patent should read as corrected below.

Column 5, line 47, strike out "to supply fresh makeup water in direct proportion to" and insert instead -- from the distributor ring and inlet head in proportion to --; column 8 lines 6 and 7, after "portion" insert -- of --.

Signed and sealed this 7th day of November 1967.

(SEAL)
Attest:

Edward M. Fletcher, Jr.                              EDWARD J. BRENNER

Attesting Officer                                      Commissioner of Patents